United States Patent

[11] 3,587,440

| [72] | Inventor | Raymond B. Giudici<br>7308 Filbert Ave., Orangevale, Calif. 95662 |
|---|---|---|
| [21] | Appl. No. | 828,635 |
| [22] | Filed | May 28, 1969 |
| [45] | Patented | June 28, 1971 |

[54] AIR FILTERING DEVICE FOR BUSES AND THE LIKE
3 Claims, 4 Drawing Figs.

[52] U.S. Cl. ................................................ 98/2.01, 55/420
[51] Int. Cl. ................................................ B60h 1/24
[50] Field of Search .................................... 98/2, (Filters), 2.2, 2.4, 2.5, 2.7; 55/417, 420

[56]  References Cited
UNITED STATES PATENTS

| 2,614,654 | 10/1952 | Strinden | 98/2 |
| 3,303,769 | 2/1967 | Williams | 98/2 |

Primary Examiner—Meyer Perlin
Attorney—Alexander B. Blair

ABSTRACT: The device provides an air duct through which filtered air is admitted to the interior of a bus and prevented from flowing from the bus. This takes advantage of the tendency of buses, trailers, campers, etc. to weave while in motion to cause a bellowslike effect which tends to draw in dusty air through cracks and crevices, the device thereby admitting only fresh air into the vehicle while the tendency of the latter to exhaust air causes such air to be discharged through cracks and crevices. Thus only fresh air is admitted to the vehicle and any dust within the vehicle tends to be discharged therefrom.

PATENTED JUN 28 1971 3,587,440

INVENTOR.
RAYMOND B. GIUDICI
BY
Alexander B. O'Blair
ATTORNEY.

AIR FILTERING DEVICE FOR BUSES AND THE LIKE

BACKGROUND OF THE INVENTION

Buses, trailers and campers sometimes travel over bumpy and dusty roads which causes the vehicle body to weave, thus at times sucking air into the vehicle and at other times discharging air from the vehicle. This entering and discharging air flows through any cracks and crevices in the vehicle body, and particularly on dusty roads the air in the interior of the body becomes extremely dusty and obnoxious.

SUMMARY OF THE INVENTION

The device comprises a casing open at opposite ends respectively to the outside of the bus and to the interior thereof and includes between the ingress and egress openings a filtering body to filter the air and a flap valve to permit the flow of air into the interior of the vehicle while preventing the discharging of air from the interior of the vehicle body through the casing. Thus when the weaving of the vehicle body tends to reduce pressure therein and such air thereinto, the air flows into the ingress opening of the present device, through the filtering body, thence past the flap valve, which opens, and into the vehicle body. When further vehicle body weaving takes place which tends to increase the pressure of air in the body, the flap valve of the present device closes to prevent reverse flow of air through the device so that air in the vehicle body, which will have been cleaned gradually, will be discharged through any available cracks crevices. Thus from time to time there will be a fresh flow of air into the vehicle body without such air in dusty form entering through cracks and crevices in the vehicle body.

DESCRIPTION OF THE PREFERRED EMBODIMENT

Figure 1:
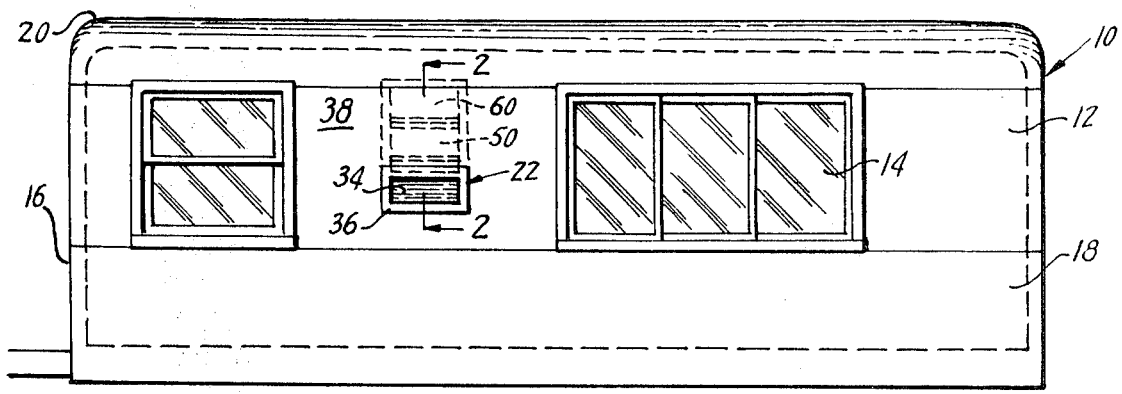
FIG. 1 is a side elevation of a vehicle body.
Figures 2, 3:
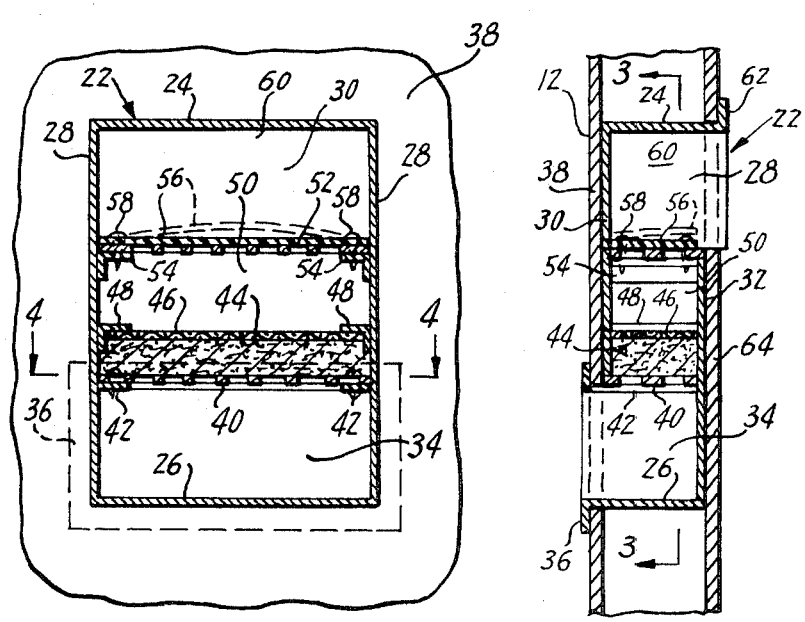
FIG. 2 is a section on line 2-2 of FIG. 1.
FIG. 3 is a section on line 3-3 of FIG. 2.
Figure 4:
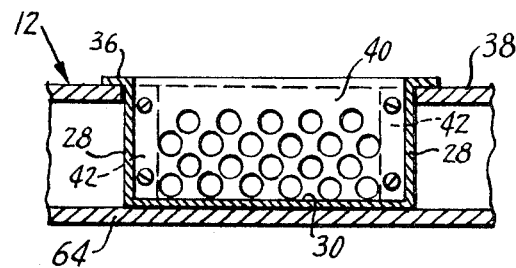
FIG. 4 is a section on line 4-4 of FIG. 3.

Referring to FIG. 1, the numeral 10 designates a vehicle body which may be a house trailer, bus or camper provided with sidewalls 12 having windows 14 therein, a front wall 16, a rear wall 18, and roof 20.

The present device is intended to be used with vehicle bodies of any of the types referred to, and while shown in a sidewall 12 thereof in FIG. 1, may be used in any wall, and preferably in the front wall. The device comprises a casing indicated as a whole by the numeral 22 and including top and bottom walls 24 and 26, sidewalls 28 and outside and inside walls 30 and 32. The casing is provided with a bottom compartment 34 opening to the outside of the vehicle, the casing being provided with a flange 36 adapted to be secured against the outside shell 38 of the wall 12. The top of the compartment 34 is defined by a perforated plate 40 supported on flanges 42 carried by the casing, and a flexible compressible filter body 44 is supported on the plate 40. Above the filter body is arranged a screen 46 retained in position by flanges 48 carries by the sidewalls 28 of the casing. Thus air flowing upwardly from the compartment 34 flows through the filter body 44 to remove dust from the air.

Above the screen 46 the casing houses an intermediate chamber 50 above which is arranged a perforated plate 52 arranged on flanges 54 carried by the sidewalls 28 of the casing. Above the plate 52 is arranged a flap valve 56 which may be made of rubber, leather, neoprene or any other suitable material, the flap valve at one side being secured to the plate 52 and to the flanges 54 by sheet metal screws 58. Air moving upwardly from the chamber or compartment 50 lifts the flap valve 56 for the flow of air into an upper compartment 60 which opens into the interior of the vehicle, the top wall 24 and sidewalls 28 being provided with an inside flange 62. The flanges 36 and 62 may be secured in any suitable manner to the outer shell 38 and inner shell 64 of the wall 12, for example, by sheet metal screws.

OPERATION

In traveling over the highways, and particularly bumpy or unpaved roads, the weaving of the vehicle body creates a bellows effect within the vehicle body which tends to alternately compress air and discharge it through cracks and crevices, and to draw air into the vehicle body through such cracks and crevices. With the present construction, any weaving of the vehicle body which tends to reduce pressure therein draws air into the chamber 34, and this air passes upwardly through the filter body 44 into the chamber 50, thence past the flap valve 56 into the chamber 60 and thence into the interior of the vehicle body. Thus air admitted into the interior of the vehicle body under the conditions referred to will be filtered air and free of dust.

When the weaving of the vehicle body tends to create a pressure therein and discharge air therefrom, the flap valve 56 prevents the reverse flow of air through the device and air within the vehicle body is forced to flow outwardly therefrom through any available cracks, crevices, or openings. Thus air admitted to the vehicle body is always filtered and air discharged from the body flowing through cracks and crevices will be filtered air, and in being discharged, room is provided within the vehicle body for the intake of additional filtered air whenever the weaving of the body of the vehicle causes the present device to operate. Thus it has been found that on the dustiest roads, the air within the vehicle body, when the windows and doors are closed, will always be clean and dust free.

The flexible screen 46 may be removed and the flexible, compressible filtering body 44 removed for cleaning or replacement when it becomes relatively clogged with dirt and dust.

From the foregoing it will now be seen that there is herein provided an improved air filtering device for buses and the like which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. An air filtering device for closed vehicles comprising a casing mounted in a wall of the vehicle and having one end open solely to the outside atmosphere and the other end open solely to the interior of the vehicle, a filter medium intermediate the ends of said casing, a perforated plate horizontally secured within said casing between said filter medium and said other casing end, and a normally closed flap valve mounted over and covering said perforated plate for admitting air to the interior of the vehicle as the air pushes said valve upward while preventing the reverse flow of air therefrom because of the blocking affect of said valve being pushed against said plate.

2. An air filtering device for closed vehicles comprising a casing mounted in a wall of the vehicle and having one end open solely to the outside atmosphere and the other end open solely to the interior of the vehicle, a filter medium intermediate the ends of said casing, said casing being vertically arranged with the lower end thereof open at the outside atmosphere and the upper end thereof open to the interior of the vehicle, a body of filter material supported in said casing above said first-named end thereof, a flexible screen above said filter body removable for access to said filter body, said body being formed of flexible compressible material to be removable upon removal of said screen, a flap valve arranged between said screen and the upper end of said casing and adapted to be unseated by air moving upwardly through said casing to admit air into the vehicle body, said flap valve normally closing to prevent a reverse flow of air from the vehicle, and a perforated plate on which said flap valve seats, said flap valve being secured at one edge to said perforated plate on the top thereof and being formed of flexible material.

3. An air filtering device for closed vehicles comprising a casing mounted in a wall of the vehicle and having one end open solely to the outside atmosphere and the other end open solely to the interior of the vehicle, a filter medium intermediate the ends of said casing, said casing vertically arranged and provided with lower, upper and intermediate chambers, said lower and upper chambers communicating respectively with the outside atmosphere and with the interior of the vehicle, a body of filter material arranged in said intermediate chamber, the top of said lower chamber formed by a perforated plate, said filter body being arranged on such plate, a second perforated plate at the top of said intermediate chamber, and a flap valve normally supported on said second plate in closed position to prevent flow of air from said upper chamber to said lower chamber, said flap valve being movable upwardly by an upwardly flowing current of air in said intermediate chamber whereby such air flows into said upper chamber and into the interior of the vehicle, said flap valve formed of flexible material fixed to said second perforated plate at the edge thereof remote from the opening of said upper chamber into the vehicle body whereby said flap valve has a free edge movable upwardly to admit air from said intermediate chamber past said flap valve into the vehicle body.